United States Patent
Cheng et al.

(10) Patent No.: US 6,963,992 B1
(45) Date of Patent: Nov. 8, 2005

(54) METHOD AND APPARATUS TO GENERATE CLOCK AND CONTROL SIGNALS FOR OVER-CLOCKING RECOVERY IN A PLL

(75) Inventors: Paul Lap Tak Cheng, Fremont, CA (US); Kuang-Yu Chen, Saratoga, CA (US); Frank Hwang, Sunnyvale, CA (US); Hueng-Cheng Eric Chen, San Jose, CA (US); Hyunbae Kim, Santa Clara, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 460 days.

(21) Appl. No.: 09/672,395

(22) Filed: Sep. 28, 2000

(51) Int. Cl.[7] ............................. G06F 1/04; G06F 1/06; G06F 1/08
(52) U.S. Cl. ...................... 713/501; 713/500; 713/503; 713/300; 713/310; 713/320; 713/322
(58) Field of Search ................................ 713/300, 310, 713/320, 322, 500, 501, 503

(56) References Cited

U.S. PATENT DOCUMENTS

| | | | | |
|---|---|---|---|---|
| 5,233,613 A | * | 8/1993 | Allen et al. ................. | 714/55 |
| 5,513,319 A | * | 4/1996 | Finch et al. ................. | 714/55 |
| 5,630,110 A | * | 5/1997 | Mote, Jr. ..................... | 713/501 |
| 5,751,665 A | * | 5/1998 | Tanoi ........................... | 368/120 |
| 5,996,083 A | * | 11/1999 | Gupta et al. ................. | 713/322 |
| 6,014,033 A | * | 1/2000 | Fitzgerald et al. ........... | 324/765 |
| 6,038,629 A | * | 3/2000 | Ogilvie et al. ............... | 710/312 |
| 6,269,443 B1 | * | 7/2001 | Poisner et al. ................ | 713/1 |
| 6,311,281 B1 | * | 10/2001 | Pole et al. .................... | 713/322 |
| 6,385,735 B1 | * | 5/2002 | Wilson et al. ............... | 713/501 |
| 6,535,986 B1 | * | 3/2003 | Rosno et al. ................ | 713/400 |

FOREIGN PATENT DOCUMENTS

JP          05055914 A      *   3/1993         ............. H03L 7/18

OTHER PUBLICATIONS

Hegde, A., "Clock distribution in high speed system", Northcon/93, Conference Record, Oct. 12-14, 1993, Page(s): 61-65.*
The I[2]C-Bus Specification, Version 2.1, Jan. 2000, pp. 1-46.
Universal Serial Bus Specificaiton, Revision 1.1, Sep. 23, 1998, pp. 1-311.
Universal Serial Bus Specificaiton, Revision 2.0, Apr. 27, 2000, pp. 1-622.

* cited by examiner

Primary Examiner—Lynne H. Browne
Assistant Examiner—James K. Trujillo
(74) Attorney, Agent, or Firm—Christopher P. Maiorana, PC

(57) ABSTRACT

An apparatus comprising a circuit that may be configured to (i) change a frequency of one or more first signals in response to a second signal and (ii) generate a third signal in response to either the second signal or a predetermined time period expiring.

21 Claims, 3 Drawing Sheets

METHOD AND APPARATUS TO GENERATE CLOCK AND CONTROL SIGNALS FOR OVER-CLOCKING RECOVERY IN A PLL

FIELD OF THE INVENTION

The present invention relates to a method and/or architecture for over-clocking generally and, more particularly, to a method and/or architecture for over-clocking recovery in a phase lock loop.

BACKGROUND OF THE INVENTION

Microprocessors can be characterized by a number of ratings. The ratings can include a nominal clock rate, an input clock range, and an input clock slew rate. The nominal clock rating can be conservative. A microprocessor with a conservative nominal clock rating can have a margin of higher clock rates at which the microprocessor will operate. Operating a microprocessor above the nominal clock rating is referred to as over-clocking.

Programmable clock circuits are used by motherboard manufacturers to enable a user to overclock the microprocessor. However, when the over-clocking frequency exceeds the input frequency range of the microprocessor, the microprocessor can lose track of the clock input and hang. In addition, if the frequency of the programmable clock circuit changes faster than the microprocessor can track (i.e., the slew rating of the microprocessor is exceeded), the microprocessor can lose track of the input clock and hang.

Referring to FIG. 1, a block diagram illustrating a microprocessor system 10 is shown. The system 10 consists of a motherboard 12, a microprocessor 14, a system block 16 that includes memory, inputs/outputs, and peripherals, and a clock circuit 18. The clock circuit 18 presents a clock signal CPUCLK to the microprocessor 14 and a clock signal SYSCLK to the system block 16. When over-clocking is desired, the frequency of the signal CPUCLK is increased above the nominal value for the microprocessor 14. If the frequency of the signal CPUCLK is set too high or changes too quickly, the microprocessor 14 will lose track and hang.

When the microprocessor 14 hangs, a recovery mechanism is required to restart the microprocessor system 10. One conventional method for over-clocking recovery is for the motherboard 12 to incorporate a separate watchdog timer or resistive-capacitive (RC) delay circuit 20. The circuit 20 resets the microprocessor after a preset amount of time if not disabled. The clock circuit 18 is reset to a default frequency for restarting the microprocessor 14. The default frequency of a conventional clock circuit 18 is set during fabrication or by jumpers 22 on the motherboard.

SUMMARY OF THE INVENTION

The present invention concerns an apparatus comprising a circuit that may be configured to (i) change a frequency of one or more first signals in response to a second signal and (ii) generate a third signal in response to either the second signal or a predetermined time period expiring.

The objects, features and advantages of the present invention include providing a method and/or architecture for over-clocking recovery in a PLL that may (i) generate a reset signal when a new frequency is loaded, (ii) reset a system when the microprocessor hangs, (iii) provide a user programmable recovery frequency, (iv) require no additional reset or frequency recovery components external to the PLL circuit, (v) provide additional bus interface timing margin, (vi) automatically select an over-clocking frequency, (vii) provide relative timing adjustment between clock signals, and/or (viii) determine an optimum system operating frequency.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 2:
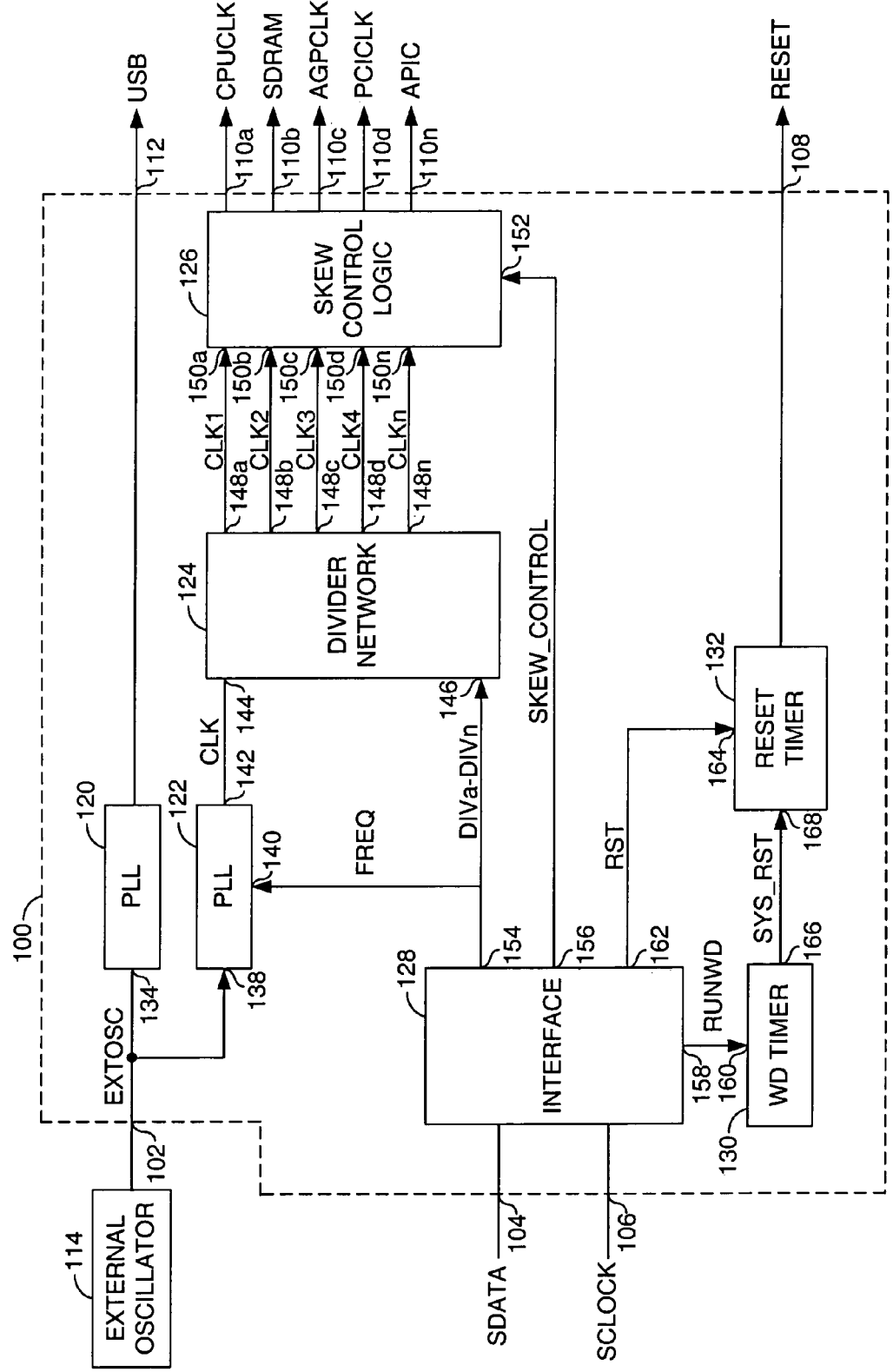
FIG. 2 is a block diagram illustrating a preferred embodiment of the present invention.

Referring to FIG. 2, a block diagram of a circuit 100 is shown in accordance with a preferred embodiment of the present invention. The circuit 100 may be a programmable clock circuit for use in microprocessor systems. In one example, commands for programming the programmable clock circuit may be incorporated in the basic input/output system (BIOS) commands or program routines of a motherboard. The BIOS commands or program routines may be stored in a non-volatile computer readable medium (e.g., BIOS ROM, boot disk, etc.).

The circuit 100 may be interfaced, in one example, via an inter-integrated circuit (I$^2$C) bus interface. However, other appropriate interfaces may be implemented to meet the design criteria of a particular application. The I$^2$C bus may be implemented as a fully bi-directional 2-wire serial bus. The I$^2$C bus may be compliant with the I$^2$C specification version 1.0 (published 1992), version 2.0 (published 1998), and/or version 2.1 (published 2000) by Philips Semiconductors each of which are hereby incorporated by reference in their entirety (version 2.1 is available on the Internet at http://www-us.semiconductors.com/i2c/). Commands and data for programming the programmable clock circuit 100 may be sent via the I$^2$C bus. The commands may result in the data being stored in registers, latches, programmable counters, timers, etc. of the circuit 100.

The circuit 100 may be configured to present a clock signal that may allow the over-clocking of the microprocessor. The circuit 100 may be further configured to recover from a processor hang due to the over-clocking. The circuit 100 may have an input 102 that may receive a signal (e.g., EXTOSC), an input 104 that may receive a signal (e.g., SDATA), and input 106 that may receive a signal (e.g., SCLOCK), an output 108 that may present a signal (e.g., RESET), a number of outputs 110a–110n that may present a number of signals (e.g., CPUCLK, SDRAM, AGPCLK, PCICLK, APIC, etc.), and an output 112 that may present a signal (e.g., USB).

The signal EXTOSC may be implemented as a clock signal. The signal EXTOSC may generated by an external oscillator circuit 114. The signal SDATA and SCLOCK may be serial data and clock signals, respectively. The signals SDATA and SCLOCK may be implemented, in one example, in compliance with a serial communication or bus standard, for example, the inter-integrated circuit (I²C) bus specification version 1.0 (published 1992), version 2.0 (published 1998), and/or version 2.1 (published 2000) by Philips Semiconductors, each of which are hereby incorporated by reference in their entirety.

The signals CPUCLK, SDRAM, AGPCLK, PCICLK, and APIC may be implemented as system clock signals. In one example, the signals CPUCLK, SDRAM, AGPCLK, PCICLK, and APIC may be used as clock signals for a central processor unit, a synchronous dynamic random access memory, an accelerated graphics port, a peripheral component interconnect, and an advanced programmable interrupt controller, respectively. However, other numbers and uses of signals may be implemented accordingly to meet the design criteria of a particular application. For example, two or more (or all) of the components of the microprocessor system may use the same clock signal.

The signal USB may be a clock signal presented at a Universal Serial Bus (USB) port. The signal USB may be compliant with the USB specification 1.0 (published November 1996), the USB specification 1.1 (published September 1998), and/or the USB specification 2.0 (published Apr. 27, 2000), each of which are hereby incorporated by reference in their entirety. The signal RESET may be implemented, in one example, as a system reset signal. However, more than one reset signal may be implemented accordingly to meet the design criteria of a particular application. For example, a processor reset signal may be implemented separately from a system reset signal.

The circuit 100 may comprise a circuit 120, a circuit 122, a circuit 124, a circuit 126, a circuit 128, a circuit 130, and a circuit 132. The circuit 120 may be implemented as a phase lock loop (PLL) circuit. The circuit 122 may be implemented as a programmable PLL circuit. For example, the circuit 122 may comprise a number of programmable counters, and/or a programmable VCO. The circuit 124 may be implemented as a divider network that may comprise a number of divider circuits. In one example, the divider network may comprise a number of programmable divider circuits. The circuit 126 may comprise a logic circuit that may be configured to control an amount of skew between a number of signals. The circuit 128 may be implemented as an interface circuit. In one example, the circuit 128 may be an I²C interface circuit. Alternatively, the circuit 128 may be implemented as any appropriate interface circuit for controlling and/or programming the circuit 100 in accordance with the design criteria of a particular application. The circuits 130 and 132 may be implemented as timer circuits. The circuit 130 may be used as a watchdog timer circuit for detecting a microprocessor hang. The circuit 132 may be used as a reset timer circuit for controlling a reset time of the microprocessor and/or the microprocessor system.

The signal EXTOSC may be presented to an input 136 of the circuit 120. The circuit 120 may be configured to generate the signal USB in response to the signal EXTOSC.

The circuit 122 may be implemented, in one example, as a programmable phase lock loop (PLL) circuit. For example, a user may program one or more frequencies, a frequency range, a gain, an acquisition rate, a duty cycle, etc. depending on the particular programmable PLL circuitry implemented. The circuit 122 may have an input 138 that may receive the signal EXTOSC, an input 140 that may receive a signal (e.g., FREQ), and an output 142 that may present a signal (e.g., CLK) to an input 144 of the circuit 124. The signal CLK may be implemented as a clock signal. The signal FREQ may be a frequency control signal. The signal FREQ may be, in one example, a multi-bit control signal. Alternatively, the signal FREQ may comprise a number of control signals. The signal FREQ may be used, for example, to program (i) input, output, and/or feedback dividers, (ii) VCO gain, and/or (iii) any other appropriate means of varying the frequency of the signal CLK.

The circuit 124 may be implemented, in one example, as a divider network. The circuit 124 may have an input 146 that may receive a number of signals (e.g., DIVa–DIVn), and a number of outputs 148a–148n that may present a number of signals (e.g., CLK1–CLKn). In one example, the signals CLK1–CLKn may be implemented as clock signals. The circuit 124 may be configured to generate the signals CLK1–CLKn, in one example, by dividing the signal CLK in response to the signals DIVa–DIVn. Alternatively, the signals DIVa–DIVn may be used to program a number of programmable dividers that may be configured to generate one or more of the signals CLK1–CLKn in response to either the signal CLK or different ones of the signals CLK1–CLKn. Alternatively, the circuit 124 may be configured to generate the signals CLK1–CLKn in response to the signals CLK and FREQ.

The circuit 126 may be implemented, in one example, as a skew control logic circuit. The circuit 126 may have a number of inputs 150a–150n that may receive the signals CLK1–CLKn and an input 152 that may receive a signal (e.g., SKEW_CONTROL). The circuit 126 may be configured to generate a number of signals (e.g., the signals CPUCLK, SDRAM, AGPCLK, PCICLK, APIC, etc.) in response to the signal SKEW_CONTROL and the signals CLK1–CLKn. The signal SKEW_CONTROL may control an amount of skew between, for example, the signals CPUCLK, SDRAM, AGPCLK, PCICLK, and APIC. For example, the circuit 126 may be used to delay or pull-in the signal CPUCLK (or any other signal) by a preset value (e.g., within a range of 150 ps to 600 ps) relative to other signals or signal groups. In another example, the skew of one or more of the signals CPUCLK, SDRAM, AGPCLK, PCICLK, and APIC may be relative to one or more others of the signals CPUCLK, SDRAM, AGPCLK, PCICLK, and APIC. The skew may be controlled for any one or combination of the signals CPUCLK, SDRAM, AGPCLK, PCICLK, and APIC.

In one example, controlling the skew of the signals CPUCLK, SDRAM, AGPCLK, PCICLK, and APIC may provide additional timing margin for any timing critical bus interface. Controlling the skew of the signals CPUCLK, SDRAM, AGPCLK, PCICLK, and APIC may provide higher frequency over-clocking than is possible without controlling skew. The programmable skew may also provide flexibility to adjust the relative timing between the signals CPUCLK, SDRAM, AGPCLK, PCICLK, and APIC without hardware changes or a redesign of the system boards.

The signals SDATA and SCLOCK may be presented to the circuit 128. The circuit 128 may have an output 154 that may present the signals FREQ and DIVa–DIVn, an output 156 that may present the signal SKEW_CONTROL, an output 158 that may present a signal (e.g., RUNWD), and an output 162 that may present the signal RST. In one example, the signals FREQ, DIVa–DIVn, RST, and RUNWD may be generated in response to commands and/or data received using the signals SDATA and SCLOCK. The signals RST and RUNWD may be control signals. The signal RUNWD may be used, in one example, to program a watchdog interval in the circuit 130. The signal RUNWD may also be used to control the operation of the circuit 130 (e.g., starting or stopping a counting or timing operation). The signal RST may be used to program a reset time interval in the circuit 132. The signal RST may also be used to initiate a reset of the processor in response to a change of the frequency of the circuit 100.

The circuit 130 may be implemented as a programmable counter, programmable timer, or other appropriate circuit for performing a watchdog timing function. The circuit 130 may have an input 160 that may receive the signal RUNWD and an output 166 that may present a signal (e.g., SYS_RST) to an input 168 of the circuit 132. The signal SYS_RST may be used as a system reset signal. The circuit 130 may be configured to start timing (or counting) in response to the circuit 100 receiving a command to change frequency. The circuit 130 may be configured to stop timing in response to the circuit 100 receiving an indication, in one example, that the processor is executing the BIOS routines.

The circuit 130 may be configured to generate the signal SYS_RST in response to a processor hang (e.g., reaching a predetermined time or count without the circuit 100 receiving the indication that the processor is executing the BIOS routines). The watchdog timer circuit 130 may start incrementing in response to the assertion of the signal RUNWD. The watchdog timer circuit 130 generally increments to a predetermined value unless the signal RUNWD is de-asserted. The predetermined value may be user programmed (via the interface circuit 128). If the signal RUNWD is de-asserted, the watchdog timer circuit 130 may return to an initial value. If the signal RUNWD remains asserted, the watchdog timer circuit 130 will generally reset the system.

The circuit 132 may be implemented, in one example, as a programmable timer or counter. However, other appropriate circuits may be implemented accordingly to meet the design criteria of a particular application. The circuit 132 may be configured to generate the signal RESET in response to either the signal RST or the signal SYS_RST. The circuit 132 may be configured to assert the signal RESET for a predetermined period of time that may be programmed in response to the signal RST. The signal RESET generated in response to the signal RST (e.g., a change in frequency) may be different (e.g., longer or shorter) from the signal RESET generated in response to the signal SYS_RST (e.g., a microprocessor hang).

Figure 3:
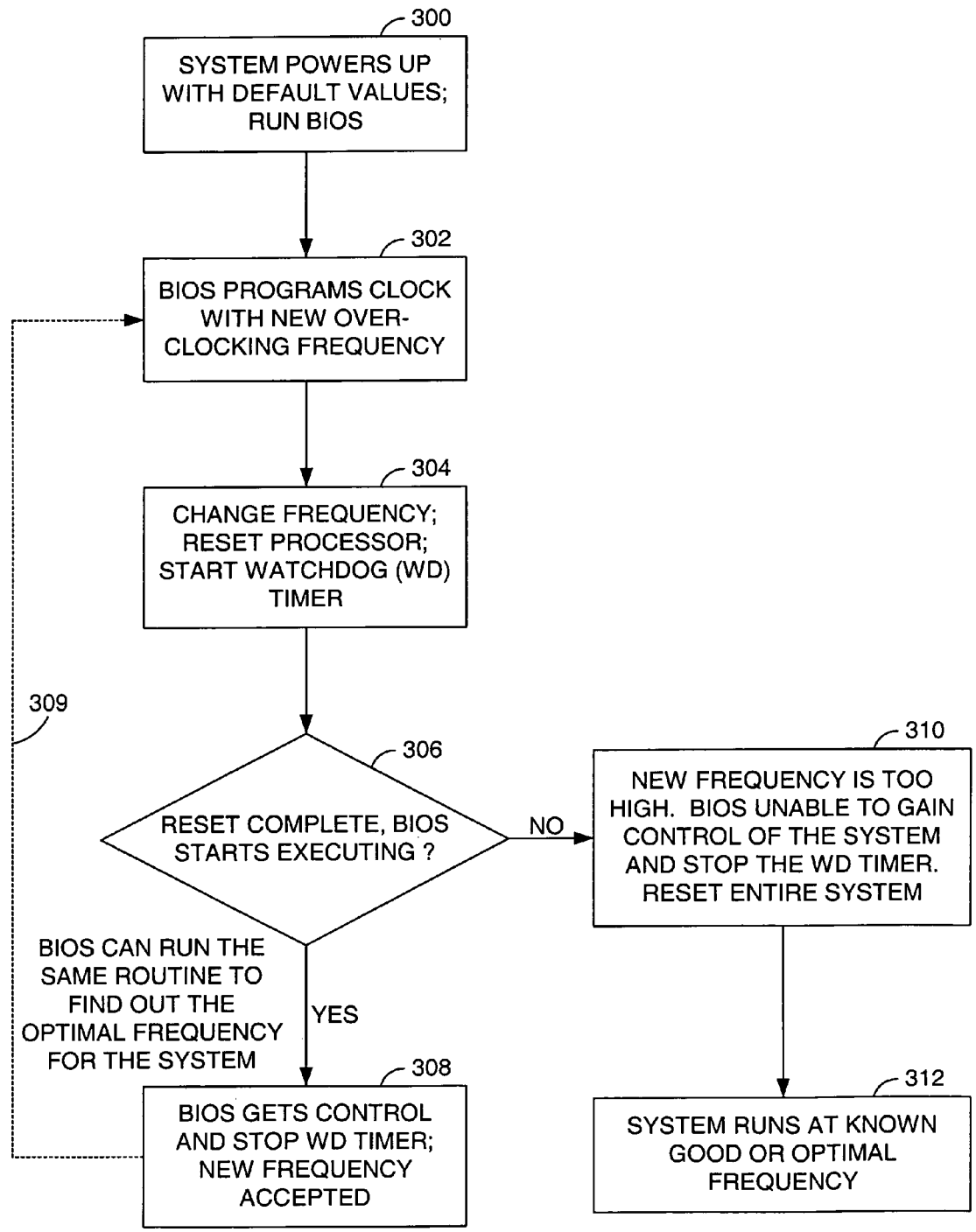
FIG. 3 is a flow diagram illustrating an example operation in accordance with a preferred embodiment of the present invention.

Referring to FIG. 3, a flow diagram illustrating an example operation of a clock circuit implemented in accordance with a preferred embodiment of the present invention is shown. The process described below may be used to (i) recover from a processor hang due to over-clocking, and/or (ii) determine an optimum frequency for over-clocking a particular processor based system.

Following power-up, a microprocessor system may begin executing instruction stored in a BIOS ROM (e.g., block 300). The instructions in the BIOS ROM may direct the microprocessor to program the circuit 100 with a new over-clocking frequency (e.g., block 302). The new over-clocking frequency may be, in one example, a predetermined (default) over-clocking frequency. Alternatively, the new over-clocking frequency may be a step in a process for determining an optimum over-clocking frequency. The reprogramming of the circuit 100 may be accomplished via an inter-integrated circuit (I²C) bus. In response to the new over-clocking frequency, the circuit 100 may be configured to alter the frequency of a clock generator (e.g., a PLL, oscillator, etc.), start a watchdog timer, and present a reset signal to a pin of the microprocessor (e.g., block 304). The watchdog timer may be programmed at manufacture with a predetermined (default) value or programmed via the I²C bus.

Following the reset, the microprocessor once again may begin executing instructions contained in the BIOS ROM (e.g., block 306). When the BIOS successfully starts to execute, the BIOS may instruct the processor to stop the watchdog timer (e.g., block 308). The processor may, in one example, send a command via the I²C bus to stop the timer circuit 130. The process may be repeated until an optimum over-clocking frequency is determined (e.g., the arrow 309). An optimum over-clocking frequency may be, in one example, the highest frequency that the processor will run at without hanging. Each time a new over-clocking frequency is used successfully to start the processor, the new frequency may be stored (e.g., in a latch, a register, a memory, etc.). When the storage medium is volatile, cycling the power may not be possible.

If a new over-clocking frequency results in a microprocessor hang, the BIOS instructions will generally not be executed and the watchdog timer will not be stopped. Once the watchdog timer reaches a maximum value (e.g., a predetermined time has passed or a maximum count is reached), a reset signal may be generated to reset the entire microprocessor system (e.g., block 310). In one example, the circuit 100 may be configured to use a predetermined (known) good frequency to clock the microprocessor following the system reset. Alternatively, the circuit 100 may be configured to use the last optimum over-clocking frequency that successfully started the system (e.g., block 312).

The circuit 100 may be configured to reset the processor with each frequency change to avoid a hang related to glitches resulting from the frequency change. The reset may be a software and/or hardware reset implemented to meet the design criteria of a particular application.

Figure 1:
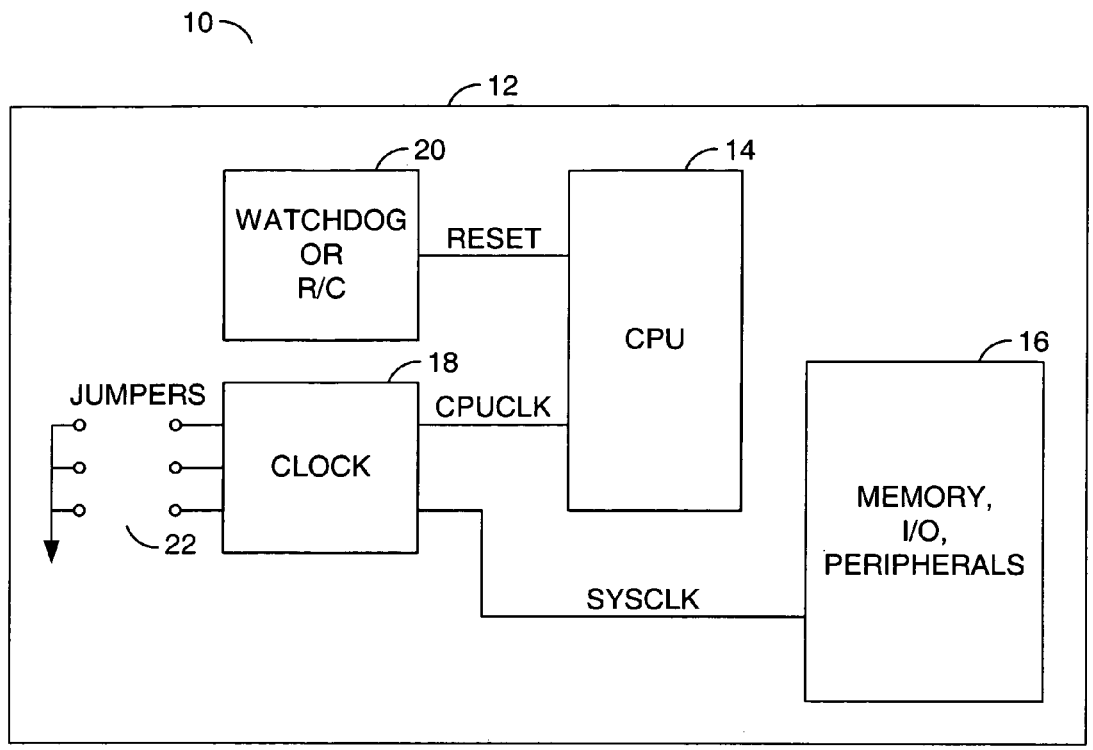
FIG. 1 is a block diagram illustrating a microprocessor system.
Figure 4:
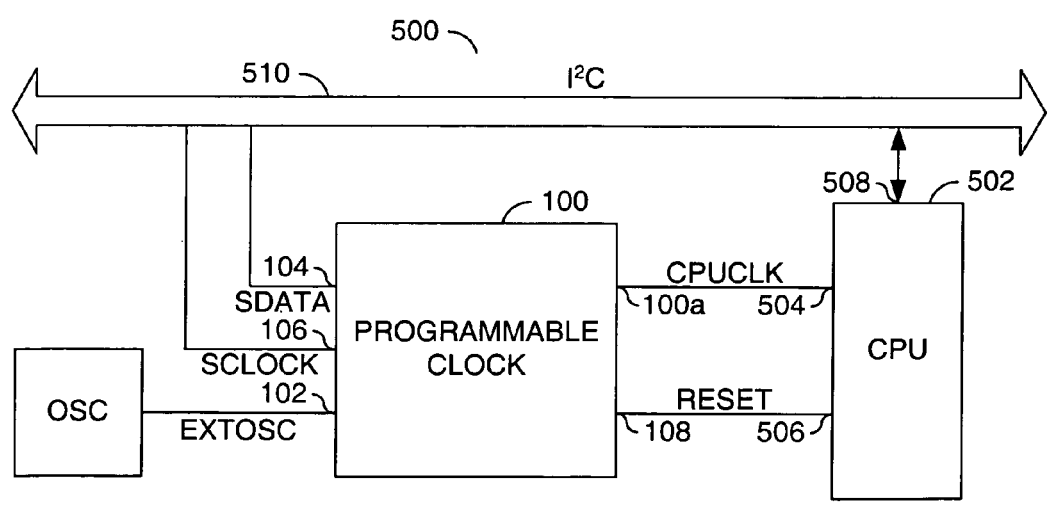
FIG. 4 is a block diagram illustrating a preferred embodiment of the present invention.

Referring to FIG. 4, a block diagram a circuit 500 illustrating a preferred embodiment of the present invention is shown. The circuit 100 may be used to over-clock a processor 502 and provide over-clocking recovery when the processor 502 hangs. The processor 502 may have an input 504 that may receive the signal CPUCLK, an input 506 that may receive the signal RESET, and an input/output 508 that may connect to communication bus 510 (e.g., an I2C bus). The circuit 100 may be programmed and controlled via the bus 510.

The present invention may provide a method and/or apparatus for over-clocking recovery in a PLL based programmable clock circuit that may (i) generate a reset signal when a new frequency is loaded, (ii) reset the system when the BIOS fails to begin executing, (iii) provide a user programmable recovery frequency, (iv) require no additional reset or frequency recovery components external to the PLL circuit, (v) provide additional bus interface timing margin, (vi) provide high frequency over-clocking, (vii) provide relative timing adjustment between clock signals, and/or (viii) determine an optimum system operating frequency.

While the present invention has been described using PLL circuits, other oscillator circuits (e.g., delay lock loops, ring oscillators, etc.) may be implemented to meet the design criteria of a particular application. The present invention may be implemented using a combination of software/firmware (e.g., BIOS routines) and/or circuitry (e.g., PLLs, timers, counters, logic circuits, combinatorial logic, state machines, etc.). While the present invention has been discussed in the context of particular BIOS program routines, appropriate software coding can readily be prepared by skilled programmers based on the teachings of the present disclosure, as will be apparent to those skilled in the relevant art(s).

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first circuit configured to generate a plurality of first clock signals, each having a frequency determined in response to one or more first control signals;
   a second circuit configured to generate said one or more first control signals and a second control signal in response to a data signal and a second clock signal; and
   a third circuit configured to generate a first reset signal in response to either said second control signal or a predetermined time period expiring.

2. The apparatus according to claim 1, wherein said one or more first control signals are configured to program said frequency of said plurality of first clock signals.

3. The apparatus according to claim 1, wherein said plurality of first clock signals are generated with one or more phase lock loop circuits.

4. The apparatus according to claim 3, wherein said one or more first control signals are configured to program at least one of said one or more phase lock loop circuits.

5. The apparatus according to claim 1, wherein said plurality of first clock signals are generated using a divider network.

6. The apparatus according to claim 1, wherein said predetermined time period is programmable.

7. The apparatus according to claim 1, wherein said second circuit is further configured to generate a third control signal and said predetermined time period is started in response to said third control signal.

8. The apparatus according to claim 7, wherein said third circuit further comprises a watchdog timer circuit configured to measure said predetermined time period in response to said third control signal.

9. The apparatus according to claim 1, wherein one of said plurality of first clock signals is presented to a clock input of a processor and said first reset signal is presented to a reset input of said processor.

10. The apparatus according to claim 9, wherein said data signal and said second clock signal are generated using a number of instructions executed by said processor.

11. The apparatus according to claim 10, wherein said instructions are contained in a computer readable medium.

12. The apparatus according to claim 10, wherein said instructions are part of a basic input output system (BIOS) routine.

13. The apparatus according to claim 9, wherein said predetermined time period expires only when said processor hangs.

14. The apparatus according to claim 1, wherein said third circuit is further configured to generate a second reset signal in response to the expiration of said predetermined time period.

15. The apparatus according to claim 14, wherein:
   said first reset signal is configured to reset a processor; and
   said second reset signal is configured to reset an entire system.

16. The apparatus according to claim 1, wherein said second circuit comprises an inter-integrated circuit ($I^2C$) interface circuit.

17. An apparatus comprising:
   a first circuit configured to chance a frequency of one or more clock signals in response to one or more first control signals, wherein said first circuit further comprises a logic circuit configured to control a skew of each of said one or more clock signals in response to a second control signal;
   a second circuit configured to generate said one or more first control signals, said second control signal and a third control signal; and
   a third circuit configured to generate a first reset signal in response to either said third control signal or a predetermined time period expiring.

18. The apparatus according to claim 17, wherein said skew is programmable.

19. An apparatus comprising:
   means for generating a plurality of first clock signals, each having a frequency determined in response to one or more first control signals;
   means for generating said one or more first control signals and second control signal in response to a data signal and second clock signal; and
   means for generating a reset signal in response to either said second control signal or a predetermined time period expiring.

20. A method for recovering in a phase lock loop circuit from a processor hang due to over-clocking comprising the steps of:
   (A) generating a plurality of first clock signals, each having a frequency determined in response to one or more first control signals;
   (B) generating said one or more first control signals and a second control signal in response to a data signal and a second clock signal, wherein said processor is reset in response to said second control signal when said frequency is changed; and
   (C) detecting whether said processor hangs in response to said frequency change.

21. The method according to claim 20, further comprising the step of:
   (D) when said processor hangs, changing said frequency of said plurality of first clock signals to a fail-safe frequency and resetting said processor.

* * * * *